Feb. 14, 1956 C. F. JORDAN, JR 2,734,950
CIRCUIT FOR PREVENTING INTERMODULATION
Filed March 18, 1954
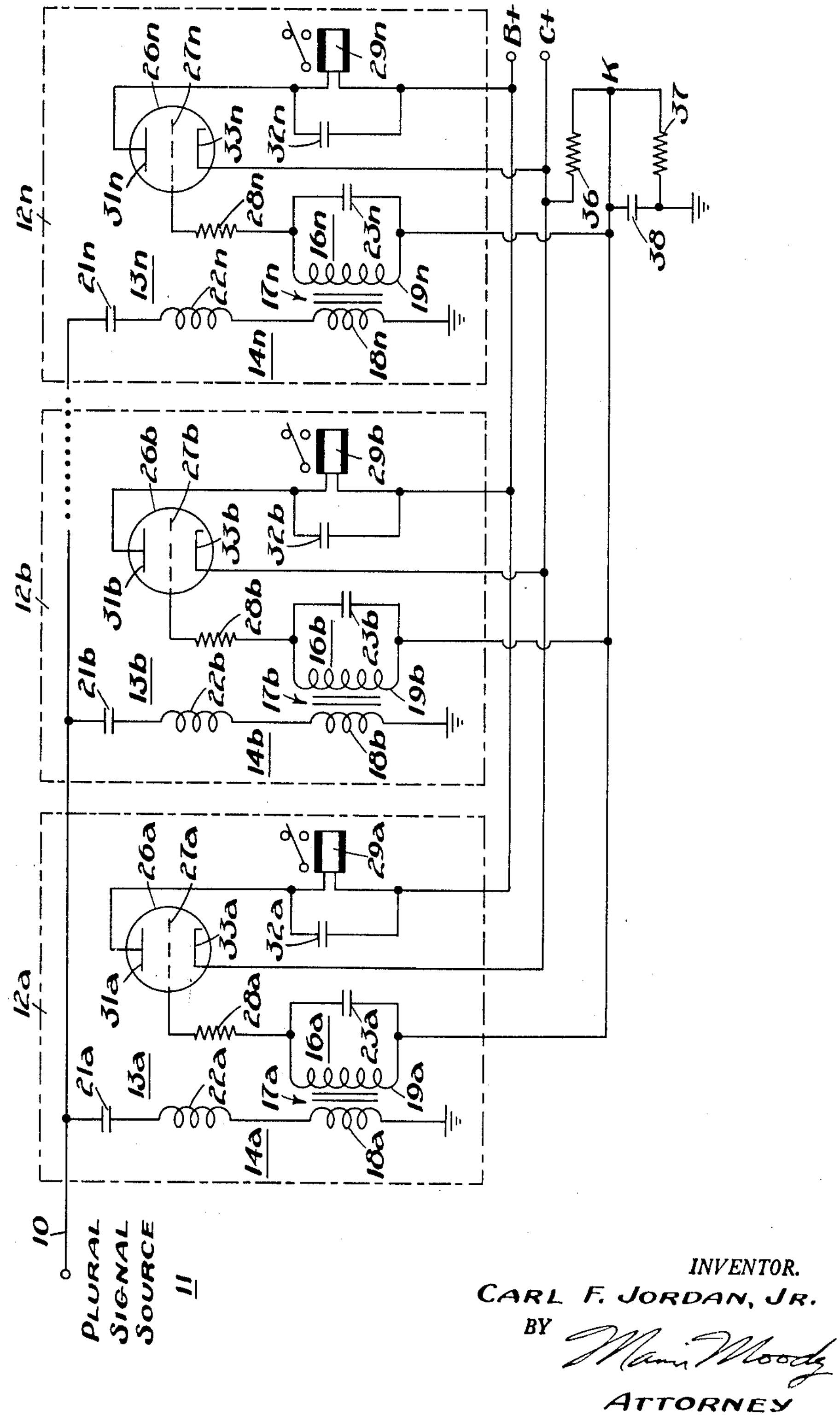
INVENTOR.
CARL F. JORDAN, JR.
BY Marvin Moody
ATTORNEY 2,734,950
Patented Feb. 14, 1956

2,734,950

CIRCUIT FOR PREVENTING INTERMODULATION

Carl F. Jordan, Jr., Cedar Rapids, Iowa, assignor to Collins Radio Corporation, Cedar Rapids, Iowa, a corporation of Iowa Application March 18, 1954, Serial No. 417,115

6 Claims. (Cl. 179—171)

This invention relates to a circuit which prevents intermodulation from interfering with the operation of frequency selection apparatus.

It is oftentimes necessary to transmit over a single transmission system a plurality of frequencies that carry separate and unrelated information. Intermodulation generally occurs between the information carrying frequencies because a degree of nonlinearity is inherent in most transmission systems which contain vacuum tubes, and secondary frequency components result. The secondary components often correspond to some of the information carrying frequencies and accordingly interfere with the selection of those information frequencies.

An example of intermodulation interference is where information carrying frequencies $f_1$ and $f_2$ are sent over a transmission system. Nonlinearity in the system generates secondary frequency components such as $f_1$ minus $f_2$ and $f_1$ plus $f_2$. The secondary frequency $f_1$ plus $f_2$ may be very close to another channel frequency $f_n$ and is hence falsely detected as frequency $f_n$. In practice, a large number of information frequencies are often transmitted at one time, and a great number of intermodulation frequencies result.

It is accordingly an object of this invention to provide a circuit that prevents intermodulation frequencies from being selected as information carrying frequencies.

It is another object of this invention to allow a plurality of channels in a radio receiver to be operated free from intermodulation response.

It is still another object of this invention to provide plural channel receiving apparatus which will not have any channel, that is temporarily unactuated by an information frequency, excited by intermodulation response.

Although appreciable, the amplitude of the intermodulation frequencies is somewhat smaller than the amplitude of the information frequencies. The invention discriminates against the intermodulated components because of their smaller amplitude.

The invention is utilized in a receiver which has a plurality of channels that are tuned to different information frequencies. Each channel is provided with a class-C operated amplifier that is biased below cutoff. When information frequencies excite any of the channels, the grids of the amplifiers are driven positive and grid current flows. The invention provides a common resistor which is connected to the grids of all of the amplifiers, and grid currents from all amplifiers that are excited at a particular time flow through it. All amplifiers, unexcited as well as excited, are biased further below cutoff by the voltage created across the resistor. The resultant bias is greater than the amplitude of the intermodulation components and less than the amplitude of the information components. The information frequencies thereby continue to excite their respective amplifiers, but the intermodulation frequencies cannot excite any amplifier. The bias is self-adjusting to a value between the amplitudes of the intermodulation and information frequencies in spite of large variations in the amplitude of the information frequencies.

Further objects, features and advantages will be apparent to a person skilled in the art upon further study of this specification and drawing, in which:

The figure is a schematic diagram of an embodiment of the invention.

Now referring to the invention in more detail, the chosen embodiment shows a lead 10 which connects to a plural signal source 11 that is the termination of a transmission system which might be the output of a radio receiver. Plural signal source 11 provides a plurality of independent information carrying frequencies and their intermodulation.

A plurality of channels 12*a*, 12*b* through 12*n* have their inputs connected in parallel to lead 10. Each of the channels 12*a* through 12*n* have identical circuitry and similar components. Similar components in the different channels are given the same numeral designation but are given a different letter designation.

The signal frequency for each channel is selected by a double-tuned circuit 13 that contains a series tuned element 14 connected to lead 10 and coupled to a parallel-tuned element 16 by means of a transformer 17 which has its primary 18 connected in series circuit 14 and its secondary 19 connected in parallel circuit 16. Series resonant circuit 14 includes a condenser 21 connected on one side to lead 10, an inductance 22 connected to the other side of condenser 21 and primary 18 connected between inductance 22 and ground. Parallel resonant circuit 16 includes a capacitor 23 connected across secondary 19.

An electron tube 26 is provided in each channel and has a control grid 27 connected by means of a resistor 28 to one side of parallel resonant circuit 16. A relay 29 provides the plate load for tube 26 and is connected between the plate 31 and a B plus voltage source. A capacitor 32 is connected across relay 29.

The cathode 33 of each tube 26 is connected to a common C plus source of unidirectional voltage, and a pair of resistors 36 and 37 are connected in series between the C plus source and ground. The common point K between resistors 36 and 37 is connected to the other side of each of the parallel-tuned circuits 16. A condenser 38 is connected across resistor 37.

Each double-tuned circuit, 12*a* through 12*n*, is tuned to a different frequency and provides the selectivity required for the respective channels. The series resonant circuits provide a low input impedance for the channels and match a low impedance signal source 11 such as the output of a cathode follower or a transmission line with a low characteristic impedance. Where a high impedance signal source is used, series-tuned circuits 14*a* through 14*n* should be replaced by parallel-tuned circuits as the input to each channel. A step-up impedance transformation is provided by transformers 17*a* through 17*n* in order to match the high impedance grid circuits of electron tubes 26*a* through 26*n*.

In operation, the number of information carrying frequencies obtained from plural signal source 11 will generally be, at any one instant, more than two and less than the total number of channels which is designated as "*n*." Each information frequency has an appropriate channel 12 tuned to it. However, intermodulation invariably occurs in signal source 11 among the information frequencies, and secondary sum and difference frequencies are included with the information frequencies in the output of signal source 11. Some of the secondary frequencies may come within the passband of one or more channels 12 which do not, at that instance, have information frequencies to excite them. This invention prevents the false excitation of such channels by secondary frequencies within their passband.

The secondary frequencies will always have a somewhat lower amplitude than the information frequencies, but the absolute amplitude of all frequencies will ordinarily be continually changing due to fading or other uncontrollable properties of the transmission system. The invention maintains a grid bias on all tubes 26 between the amplitudes of the information frequencies and the spurious frequencies. In this manner, all information frequencies have sufficient amplitude to excite their proper channels, but the intermodulation frequencies do not have sufficient amplitude to overcome the bias and excite the channels. Resistor 37 provides the required automatic grid bias, as is described below.

The C plus unidirectional voltage source which is connected to cathodes 33 maintains a constant bias on tubes 26 that is below cut-off so that tubes 26 are always ready for class-C operation.

When a plurality of information frequencies are received by lead 10, the double-tuned circuits 13 provide large voltages to their grids 27. These voltages drive their grids above cutoff in the manner of class C amplifiers and cause grid current to flow which passes through common resistor 37 to ground after passing through resistors 28 and secondaries 19, respectively.

The total grid current that passes through resistor 37 creates an additional negative bias on the grids of all amplifiers and is proportional to the amplitude and number of information frequencies that are received. The value of resistor 37 is chosen to provide a biasing voltage that is between the amplitudes of the information and intermodulation frequencies received on the grids.

When the signal received by lead 10 becomes smaller due to fading or change of distance in the transmission system, the amplitudes of the information frequency voltages become less, and a smaller amount of grid current flows through resistor 37. The bias self-adjusts itself to a lesser value between the smaller amplitudes of the information and intermodulation frequencies. In this manner, the circuit self-adjusts itself under varying conditions of reception to admit information frequencies and exclude intermodulation.

Capacitor 38 bypasses to ground the high frequency components of grid current and permits its direct current component to pass through resistor 37. Resistor 36 isolates the bias voltage across resistor 37 from the low impedance C plus voltage source and with resistor 36 provides a voltage divider that obtains a steady state class-C bias on tubes 26.

The capacitors 32 allow the high frequency components of plate current to bypass relays 29 so that they are primarily actuated by the direct current component. The contacts of relays 29 may be connected in any manner that is required to utilize the off-on information received by the respective channels. It is to be realized however that other types of information may be utilized by the channels if the relays are replaced by appropriate demodulation circuitry.

It is therefore seen that this invention prevents intermodulation from exciting the channels that are not receiving information frequencies although the intermodulation frequencies may be within the bandpass of those channels.

While a single embodiment has been described, it will be realized that various changes may be made in the general arrangement thereof which will be within the true spirit and scope of the invention as defined in the appended claims.

I claim:

1. Means for preventing intermodulation interference in electronic apparatus connected to a plural signal source comprising, a plurality of channels in said apparatus, a frequency selective means in each of said channels connected to said signal source, the frequency selective means of each channel tuned to a different frequency, a plurality of class-C amplifiers, the grids of said amplifiers connected to said frequency selective means respectively, an information receiving means connected in the plate circuit of each of said amplifiers, a first resistor connected at one end to the cathodes of all said amplifiers, a second resistor connected between the other end of said first resistor and ground, the common point between said first and second resistors connected to said frequency selective means, and a capacitor connected across said second resistor.

2. Means for preventing intermodulation interference in plural channel receiving apparatus connected to a plural signal source comprising, a plurality of tuned circuits with their inputs connected in parallel across signal source, a plurality of amplifiers, the grids of said amplifiers connected to one side of the outputs of said tuned circuits respectively, a plurality of information receiving means connected to the plates of each of said amplifiers respectively, a unidirectional voltage connected to the cathodes of all of said amplifiers to bias them for class-C operation, a first resistor connected at one end to the cathodes of all of said amplifiers, a second resistor connected between ground and the other end of said first resistor, a capacitor connected across said second resistor, and the common point between said resistors connected to the other side of the outputs of all of said tuned circuits.

3. Means for preventing intermodulation interference in plural channel receiving apparatus connected to a plural signal source comprising, a plurality of double tuned circuits with their inputs connected in parallel across said signal source, each of said tuned circuits resonant at a different signal frequency, a plurality of amplifiers connected for class-C operation, a first resistor connected at one end to the cathodes of all of said amplifiers, a second resistor connected between the other end of said first resistor and ground, the common point between said first and second resistor connected to one output terminal of each of said double tuned circuits, a plurality of third resistors connected respectively between the grid of one of said amplifiers and the other output terminal of the adjacent double tuned circuit, a plurality of information receiving means connected respectively to the plate of each amplifier, and a capacitor connected across said second resistor.

4. Means for preventing intermodulation interference in plural channel receiving apparatus comprising, a plural signal source which provides a plurality of information frequencies and their intermodulation, a plurality of double tuned circuits in which each includes a series tuned circuit connected across said signal source, and a parallel tuned circuit coupled to said series tuned circuit, a plurality of amplifier tubes connected for class-C operation, a first resistor connected at one end to the cathodes of all of said amplifier tubes, a second resistor connected between the other end of said first resistor and ground, a capacitor connected across said second resistor, the ungrounded end of said second resistor also connected to one side of all of said parallel tuned circuits, a plurality of third resistors, each of said third resistors connected respectively between the control grids of said amplifier tubes and the other side of the adjacent of said parallel tuned circuit, a plurality of information receiving means, and one of said information receiving means connected to the plate of each of said amplifier tubes.

5. Means for preventing intermodulation interference in receiving apparatus connected to a plural signal source comprising, a plurality of channels in said apparatus, a series tuned circuit in each channel connected across said signal source to provide the input for each of said channels, a parallel tuned circuit in each channel coupled to its series tuned circuit, an amplifier tube in each of said channels connected for class-C operation, a first resistor connected at one end to all of the cathodes of said amplifier tube, a second resistor connected between the other end of first resistor and ground, a capacitor connected across said second resistor, the ungrounded end of said second resistor also connected to one side of each of said parallel tuned circuits, a plurality of third resistors, one of said third resistors in each channel connected between the control grid of the amplifier and the other side of the parallel tuned circuit, and information receiving means connected to the outputs of the amplifier tubes.

6. Means for preventing intermodulation interference in electronic apparatus connected to a plural signal source comprising a plurality of channels in said apparatus, frequency selective means provided in each of said channels and connected to said signal source, the frequencies selective means of each channel tuned to a different frequency, a plurality of class-C biased amplifiers with one provided in each channel, the control electrodes of said amplifiers connected, respectively, to said frequency selective means within the respective channels, a plurality of information receiving means each connected, respectively, to the output of each of said amplifiers in the respective channels, a resistor means connected in series with the control electrode of each amplifier, whereby signals to some of the channels increases the bias on the amplifiers sufficiently to prevent second order intermodulation components from actuating those channels not receiving an intended signal.

References Cited in the file of this patent

UNITED STATES PATENTS

| | | |
|---|---|---|
| 2,148,578 | Pullis | Feb. 28, 1939 |
| 2,299,229 | Hall | Oct. 20, 1942 |
| 2,677,122 | Gardner, Jr. | Apr. 27, 1954 |